(No Model.)  2 Sheets—Sheet 1.
G. P. HILER.
ICE VELOCIPEDE.
No. 351,771.  Patented Nov. 2, 1886.
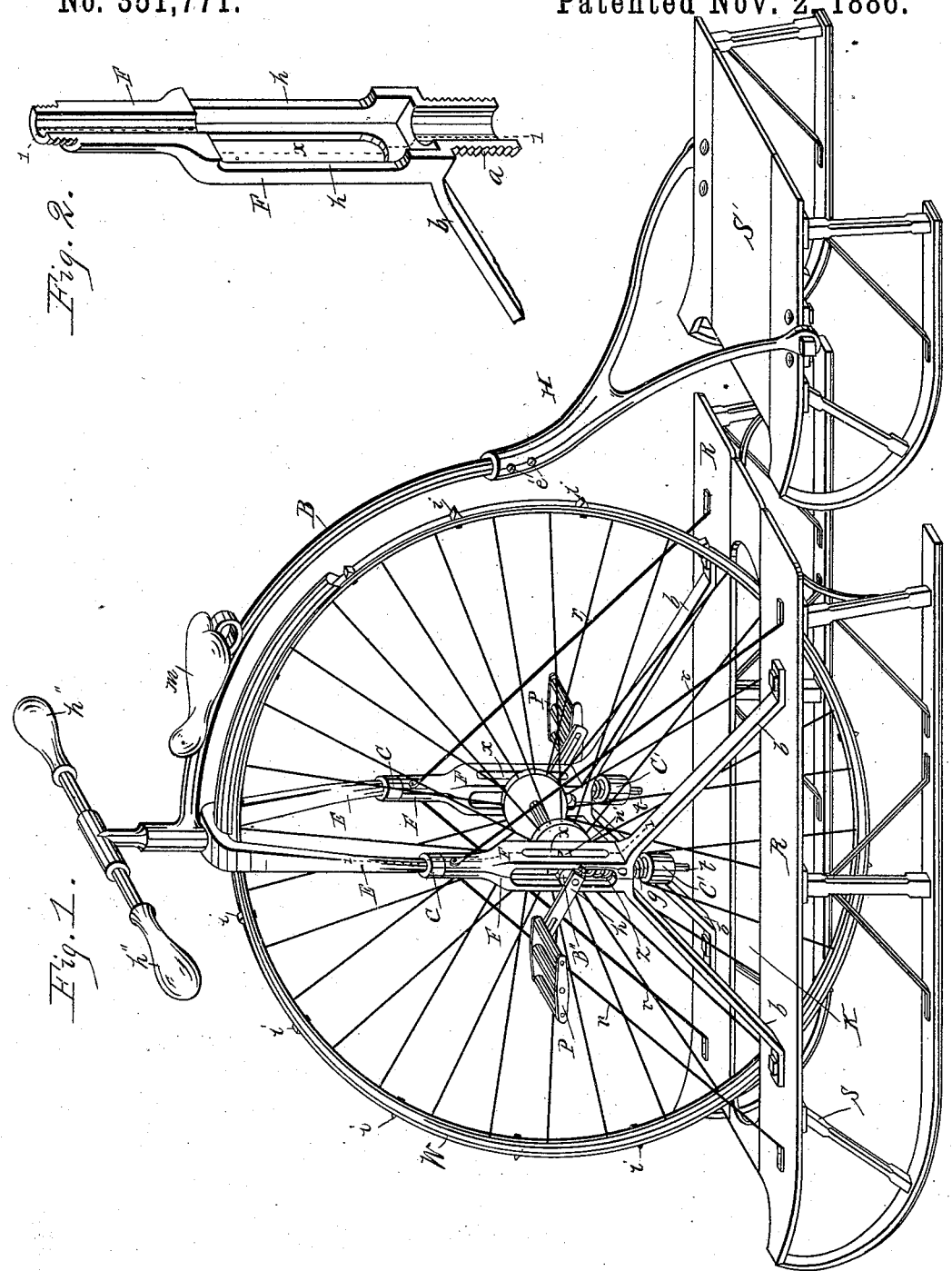
ATTEST.
C. W. Russell
B. F. Wheeler
INVENTOR.
Giles P. Hiler
By Roscoe B. Wheeler
Atty

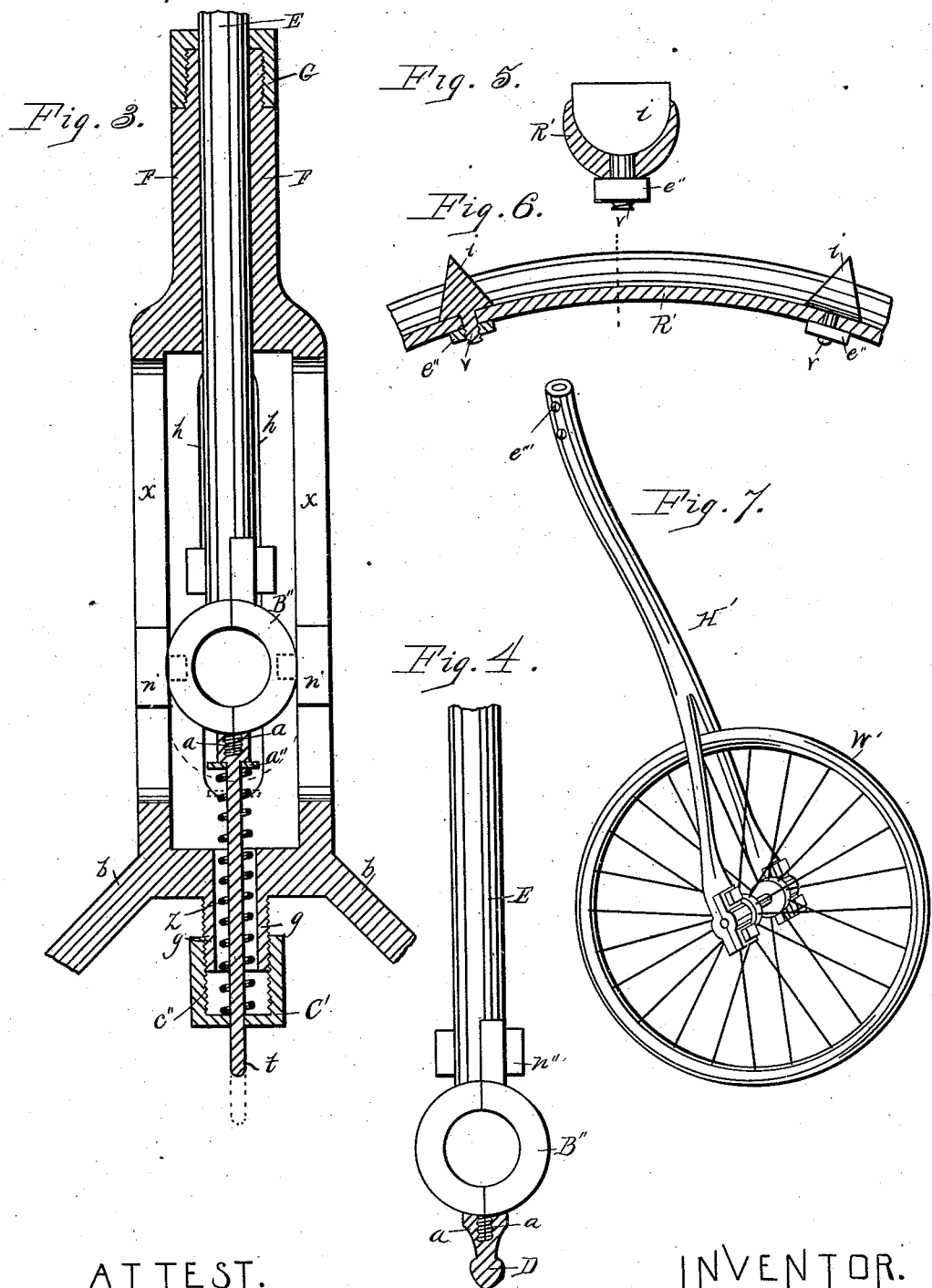

UNITED STATES PATENT OFFICE.

GILES P. HILER, OF GRAND HAVEN, MICHIGAN.

ICE-VELOCIPEDE.

SPECIFICATION forming part of Letters Patent No. 351,771, dated November 2, 1886.

Application filed May 29, 1886. Serial No. 203,581. (No model.)

*To all whom it may concern:*

Be it known that I, GILES P. HILER, a citizen of the United States, residing at Grand Haven, in the county of Ottawa and State of Michigan, have invented certain new and useful Improvements in Sleigh Attachments to Bicycles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a sleigh attachment for an ordinary bicycle, whereby the bicycle may be used as a propelling or driving means for a sleigh on snow or ice; and my invention consists in the construction of parts as hereinafter set forth, and pointed out particularly in the claims.

In the drawings forming a part of this specification, Figure 1 is an isometrical of my invention. Fig. 2 is an enlarged view of one-half of one of the coupling standards. Fig. 3 is an enlarged view of a coupling standard, being in section on dotted lines 1 1 of Figs. 1 and 2, showing also location of connecting parts. Figs. 4, 5, 6, and 7 are enlarged details.

In the drawings, W represents the ordinary drive-wheel of a bicycle, having the common rubber tire removed and a series of penetrating brads or prongs, $i$, located within the concaved periphery of the wheel-rim by means of nuts $e''$. The brads are intended to penetrate the snow and ice, to prevent slipping of the wheel and to give propelling power.

S is an ordinary hand-sleigh; R R, the side rails with space K between them, through which the wheel W travels.

E E represent the arms of an ordinary fork of a bicycle having a box, B'', or journal-bearing for the ends of the axle of the wheel W. To the under face of said boxes I attach a two-part threaded stem, $a\,a$, and over said stems I screw the guide-rods $t\,t$, as shown in Figs. 1 and 3. Fitting over said rods I employ the coiled tension-springs Z Z, their upper ends pressing against a washer, $a''$, located on the guide-rods $t\,t$. The lower end of the springs have a bearing within the internally-screw-threaded cups C', through which the guide-stems $t\,t$ have a vertical movement. I attach to the boxes B'' the square-headed bolts $n'\,n'$; and fitting freely over the arms E E of the fork, the boxes B' B'', and coiled wires, I employ the two-part coupling-standards F F, each part being provided with a downward extending leg, $b$. The upper ends of the standards are screw-threaded, over which I screw the caps C C, thus binding the parts together.

The arms E E have a free vertical movement through the caps C, and $g\,g$ is a two-part externally-screw-threaded neck formed on the lower ends of the standards, over which I screw the cups C' C', the adjustment of the pressure of the springs being accomplished by the screwing of the cups upon the necks $g$, for the purposes hereinafter fully explained. As the arms E E rise and fall the heads of the screw-bolts $n'\,n'$ slide in the vertical channels X X of the coupling-standards.

H is a forked coupling, one end of which is made to receive the rear end of the bicycle backbone B, and is held by set-screws $e'$. The forks are pivotally attached to the rear sleigh, S'. Said sleigh may be used for carrying bundles, or a person may ride upon it. In Fig. 1 I show four brace-rods, $r$, which extend from the rails of the sleigh to the upper ends of the couplings F F.

When the parts are in position, as shown in Fig. 1, the weight of the operator on the seat $m$ is thrown upon the rear sleigh and upon the springs Z Z, conveying the weight to the forward sleigh also. The springs should be sufficiently weak to allow the bicycle-wheel W to have a firm bearing upon the snow or ice sufficient to allow the penetrating-brads to enter the snow and ice, to give propelling power by preventing the wheel from slipping. As the wheel passes over an elevation the springs hold the sleigh S down, and also allows the wheel W to drop into a rut or depression. Should there be too great a pressure upon the wheel W, I screw the cups C' C' onto the necks $g$ of the coupling-standards, when the weight will be partly taken from the wheel W and conveyed to the sleigh S; and to throw the weight upon the wheel W the cups C' are screwed down or lowered, as shown in Fig. 3. By this arrangement the weight of the operator may be readily and nicely divided between the wheel and sleighs. The wheel W is propelled by the action of the feet of the operator upon the ordinary treadles, P P, of the bicycle.

To change the machine of Fig. 1 to an ordinary bicycle, I detach the forked coupling H and attach the part H' of Fig. 7, in which the wheel w' is the ordinary rear wheel of a bicycle, the caps C C are unscrewed, then the cups C' C', when the parts F, forming the coupling-standards, may be removed after detaching the treadle-cranks h. I then unscrew the guide-rods t and attach to the two-part threaded stems a a the threaded nuts D, as clearly shown in Fig. 4. I then remove the brads i from the wheel W and insert the common rubber tire, when I have an ordinary bicycle. The threaded bolts n' n' may also be removed. The forward sleigh is guided by the turning of the handles h" h" of the bicycle.

Having thus fully set forth my invention, what I claim as new, and desire to secure by Letters Patent, is—

1. In a device for the purpose set forth, the combination of the drive-wheel of a bicycle, the fork, the backbone, the sleigh detachably secured thereto, the coupling-standards, each consisting of two parts coupled together and attached to the arms of the fork and having their lower ends attached to the forward sleigh, the springs and devices for adjusting said springs, the handles for guiding and treadles for propelling said device, as and for the purposes set forth.

2. In a device for the purposes set forth, the combination of the main wheel of a bicycle having a series of detachable spurs located in the concave of its periphery, the fork, the backbone, the sleigh attached to said backbone, the coupling-standards made in two parts with legs coupling said standards to the forward sleigh, the guide-stems anchored to the boxes B", the coiled wires encircling said stems, the cups screw-threaded to the necks of the standards, the caps C, and treadles for propelling said device.

3. In a device for the purposes set forth, the combination of the drive-wheel of a bicycle, the forks, its arms adapted to have vertical movement in the coupling-standards, the sleigh attached to the legs of said standards, the coupling securing said standards together, the coiled springs, the guide-rods and treadles for propelling said machine, the backbone, the seat mounted thereon, and the rear sleigh attached to the backbone, as and for the purposes specified.

In testimony whereof I affix my signature in presence of two witnesses.

GILES P. HILER.

Witnesses:
WILLIAM F. KELLY,
CHAS. E. SOULE.